March 12, 1968   J. A. DAHLGREN   3,373,082
CONTROL OF NUCLEAR POWER REACTOR
Filed Jan. 11, 1966   4 Sheets-Sheet 1

Inventor:
Jöns Arthur Dahlgren

United States Patent Office 3,373,082
Patented Mar. 12, 1968

3,373,082
CONTROL OF NUCLEAR POWER REACTOR
Jöns Arthur Dahlgren, Saltsjobaden, Sweden, assignor to Alfa-Laval AB, Tumba, Sweden, a corporation of Sweden
Filed Jan. 11, 1966, Ser. No. 520,005
Claims priority, application Sweden, Jan. 20, 1965, 687/65
5 Claims. (Cl. 176—28)

ABSTRACT OF THE DISCLOSURE

The reactor core contains fuel elements extending generally parallel to a central axis of the core and having respective longitudinal axes located at different radial distances from the core axis. A moderator fluid is fed into the core and between the fuel elements, and means are provided to mount each of at least some of those elements for rotation about only one axis which is offset from the core axis and is eccentric to and parallels the said longitudinal axis of the element, whereby the quantity of moderator fluid between the fuel elements is variable.

The disclosure

The present invention relates to a heterogeneous nuclear power reactor and aims at improving the fuel economy, and at an increased uniformity as to the effective power dispension of the fuel, by so displacing the fuel elements in the core that the relationship between the volumes of the fuel and of the moderator water will be changed in order to compensate for changes in the fuel owing to how far the burn-up has gone.

Heavy water reactors are characterized by the fact that they can maintain a fission reaction with fuel that contains a small proportion of fissile isotope, for instance uranium with the atomic weight 235, termed U235. Thus, natural uranium with a content of .71% of U235 and the rest consisting of the isotope U238 can be used in a heavy water reactor.

On the fission of 1 gram fissile material, for instance U235, a heat quantity of about 1 megawatt during 24 hours is liberated, which is equal to 24,000 kwh. In 1 kilogram of natural uranium with a content of 7.1 grams U235, there is consequently a fission energy of 7.1 megawatt during 24 hours in the fissile isotope.

The fissile isotope, however, cannot be burned up entirely, for the fission process ceases long before there is a shortage of fissile material. In the most favorable cases, a content of about .5% of a fissile isotope will support a neutron reaction in a heavy water reactor. If the development of energy would depend exclusively on the isotope U235 in the fuel, only 7.1 minus 5 (that is, only about 2 grams per kilogram of natural uranium) could thus be burned, and only about 2 megawatt during 24 hours of energy could be obtained per kilogram.

The uranium isotope U238, that amounts to 99.3% of natural uranium, is a fertile uranium isotope. That is, it will become fissile after absorption of one neutron which converts the isotope into another element, plutonium Pu239, which is not only fissile but will also absorb more neutrons than U235, particularly at a comparatively high moderator water temperature. Whereas fissile material can be made to split after absorption of one neutron, two neutrons will be required for the fission of fertile material. On absorption of one neutron in U235, a medium number of 2.05 neutrons with high energy will be developed which, when colliding with the deuterium nuclei, will be moderated or slowed down to speeds corresponding to thermic motion by the heavy water. Out of these 2.05 neutrons, one neutron is consumed for maintaining the fission process by bringing about a further fission, whereas at least .15 or .20 neutron are lost owing to leakage from the reactor and owing to parasitic absorption in the moderator, construction materials and fission products in the fuel. The remaining .85 to .90 neutron are absorbed in the fertile part of the fuel and form new fissile material. Therefore, only about .2 gram of the fissionable content is consumed when one gram of uranium is burned to generate about 1 megawatt during 24 hours of energy.

The regeneration of fissile material, plutonium Pu239, out of fertile material U238 is called conversion. The conversion means that the content of fissile isotopes during the burn-up is not decreased very quickly, and therefore the fission process can proceed further and liberate energy by the aid of the burning of fertile material as well.

The conversion involves partly the absorption of slowed down, so-called thermic neutrons by the fertile uranium isotope U238, which absorption depends on the relationship between the contents of fissionable and fertile material and their respective absorption ability. The conversion also involves the absorption, on a lower level of energy, of partly slowed down neutrons of the kind that have attained so-called resonance energy, i.e., the kind of energy to which the fertile material is particularly highly absorbent. This last-mentioned part of the conversion can be controlled, for instance, by controlling the amount of neutron slowing-down heavy water in the reaction core in relation to the amount of fuel. A large quantity of moderating water in relation to the amount of fuel decreases the resonance absorption by the fertile material.

The plutonium will be dominating as to its quantity and total power of absorption in comparison to the original fissionable isotope U235 with increasing burn-up. On fission, it will give somewhat fewer neutrons per absorbed neutron than U235. When the moderator water is hot, averagely about 1.9 neutrons are produced at the absorption of one neutron in plutonium. A smaller number of neutrons will therefore be left for conversion on fission of plutonium, in comparison with U235, and a smaller part of the fertile material will consequently be burned with plutonium.

The fuel combination of fertile thorium and the fissile element U233 developed by conversion of thorium, to which the invention is applicable as well, gives a better conversion than the U238-Pu-combination.

For a reactor core with a given geometrical pattern, the reaction tendency changes with the temperature of the moderator water and of the fuel. When power is delivered, fission products of a short life are formed, for instance xenon which absorbs about .06 neutron per fission. The burning-up of the fuel, which is reflected by a decreasing reaction tendency owing to a decreasing amount of fissile isotope and the formation of stable absorbent fission products, adds to differences in the reaction tendency. A cold reactor with no fuel has a large excess of neutrons per fission in comparison with a hot burned up reactor at full power delivery. In order to avoid power increases above the wanted power level, the excess of neutrons is compensated by means of absorber rods and absorber solutions in the heavy water.

This controlling absorption of neutrons means a loss of neutrons and decreased conversion, and this is particularly the case in connection with the controlling over a long period of time to compensate for variation of the quantity of fissile isotope and the increasing amount of stable fission products with an absorbent quality. The controlling with reference to the temperature and the amount of absorbent fission products of a short life results in a smaller loss of neutrons, as it is eliminated at full temperature and full reactor power with a balanced production of, for instance, xenon.

The controlling of the excess of neutrons by means of absorber rods, which are pushed into the core between the fuel elements, has the further drawback that considerable local distortions arise in the flow of neutrons, so that the power dispension of the fuel of the core will be more ununiform, which decreases the possible power output from the fuel charge of the reactor.

The introduction of absorber in the moderator water does not result in local disturbances of the flow of neutrons, but it has other drawbacks. For example, the chemical and neutron-physical properties of the moderator water are changed. A too-large introduction of absorber in the water might spoil the safety qualities of the reactor and its natural self-controlling property at temperature increases and steam formation. The latter obviously reduce the moderation ability owing to the rarefaction and the decreased slowing down effect of the water, more neutrons being thus consumed for conversion, and a less number of neutrons acting in connection with fission processes so that the power output decreases. If there is an absorber in the water, the rarefaction of the water owing to temperature increase or steam formation causes the amount of absorber in the core to be decreased.

The losses of neutrons in connection with long term controlling with reference to changes of the burn-up may be decreased if the fuel of the core is substituted in small portions so that the excess of neutrons of the new fuel is absorbed by the most burned-up part of the fuel in the core, and makes it possible for the latter to burn up further. The fuel of the core may, for instance, be divided in three zones, a central zone, an interjacent zone, and a periphery zone, the new fuel being added to the periphery zone which has the smallest neutron flow, whereas the partly burned-up fuel in the interjacent zone is moved to the central zone with the largest neutron flow, and the former fuel in the central zone is removed from the reactor core in the form of burned-up fuel. Each third of the fuel of the core will thus pass the same burning-up story which adds to the uniform burn-up of the fuel. The drawback of partly substituting the fuel of the core is that the reactor has to be taken out of operation and opened more frequently, which decreases its effective operation time as a source of energy. This drawback is of importance in connection with natural uranium with its low content of fissile isotope and comparatively short burn-up times. With the high burn-up of 9 megawatt during 24 hours per kilogram and the medium intensity of 30 kw./kg. of natural uranium, the burn-up time will be 300 full-power days and nights, and the time between recharges in connection with three zone charging 100 full-power days and nights. The time required for a charging operation may be estimated at 10 to 20 days in favorable cases. Preferably, the time between two charging operations should be extended to at least one year in order to obtain a favorable use of the reactor. It is not economical to try to attain this permanent time operation by using more fuel in the core and thus a lower power intensity, for more heavy water is then needed in the core. Further, a low power intensity does not fit in with the attempts to obtain the largest possible power output from a pressure tank of limited size that is practicable from the engineering point of view.

If enriched fuel (i.e., fuel with a higher content of fissile isotope than the natural content) is used, longer operation times between the rechargings may be obtained, but the problems of the excess of neutrons which have to be absorbed with the accompanying losses will be aggravated. Long operation times in fuel cores with a given geometrical pattern and with a given moderator fluid are always accompanied by a complicated absorber control with losses in its train.

The present invention is intended to effect a long time control, free from distortions and without neutron losses (i.e., a compensation for the decrease in fissile isotopes and the increase in stable absorbing fission products) by changing the core geometrical pattern so that the relationship between the quantities of the fuel and the moderator water is varied. The neutron equilibrium at full and continuous reactor power output is then controlled by adjusting the moderation (the slowing down of the neutrons and thus the conversion) so that a greater number of neutrons is transferred to fissions from the conversion, simultaneously with the burn-up changes. At the beginning of the burn-up, the new fuel should consequently be arranged closely in a small quantity of moderator water, and at the end of the burn-up the burned-up fuel should be arranged openly in an expanded pattern in a larger quantity of moderator water.

For short term controlling, ordinary absorber rods or an absorber solution may be used; but at least at the end of the burn-up a part of that function can be effected by changing the geometrical pattern.

The change of the geometrical pattern may be accomplished by displacing, through a short distance, one or more of each fuel containing part (each fuel element) during the operation of the reactor and under the full operation pressure of the reactor or during a very short shut-down period such that a suitable geometrical pattern is obtained.

The extreme cases of the mobility of the fuel elements comprise, on the one hand, constantly movable and automatically governed elements adjusting their position also with reference to the needs of the short term controlling and, on the other hand, elements suspended so that they will be manually displaced at long intervals of time, and possibly with the reactor shut down.

For a better understanding of the invention, reference may be had to the accompanying drawings in which.

Figure 1A:
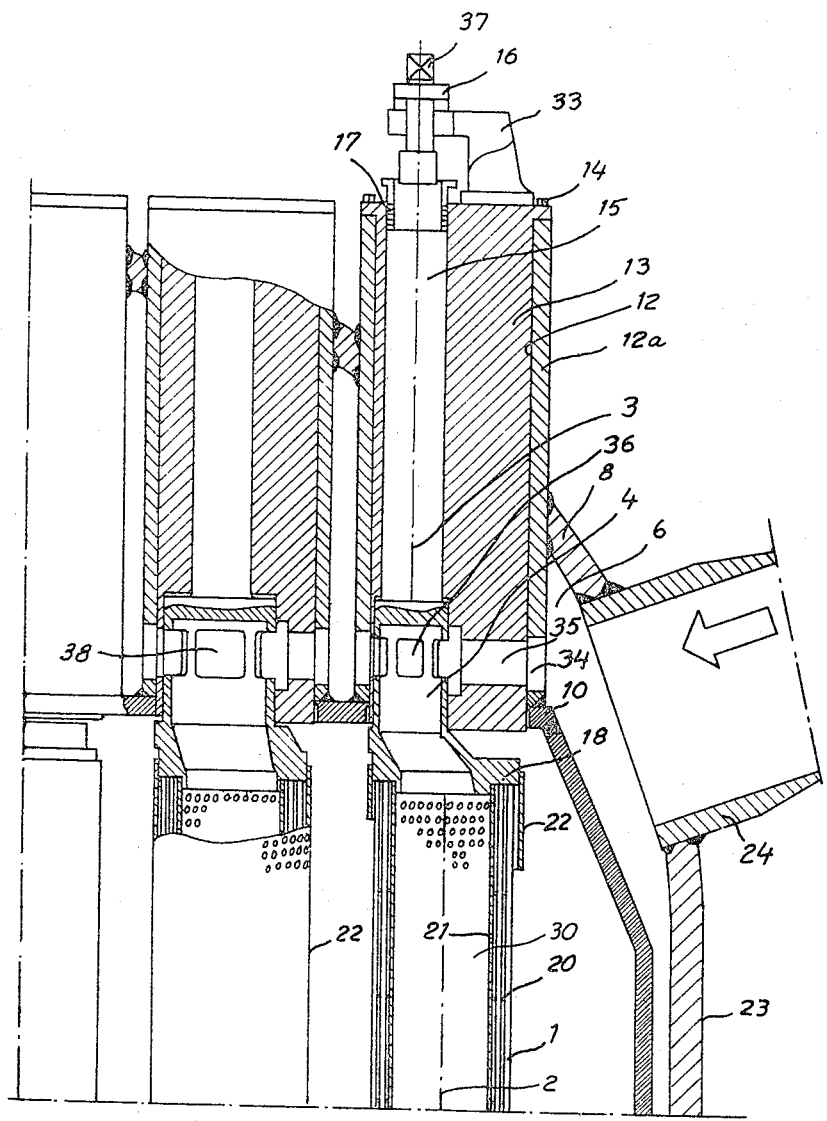
FIG. 1a is a vertical sectional view of the upper right-hand part of a preferred form of the new reactor.
Figure 1B:
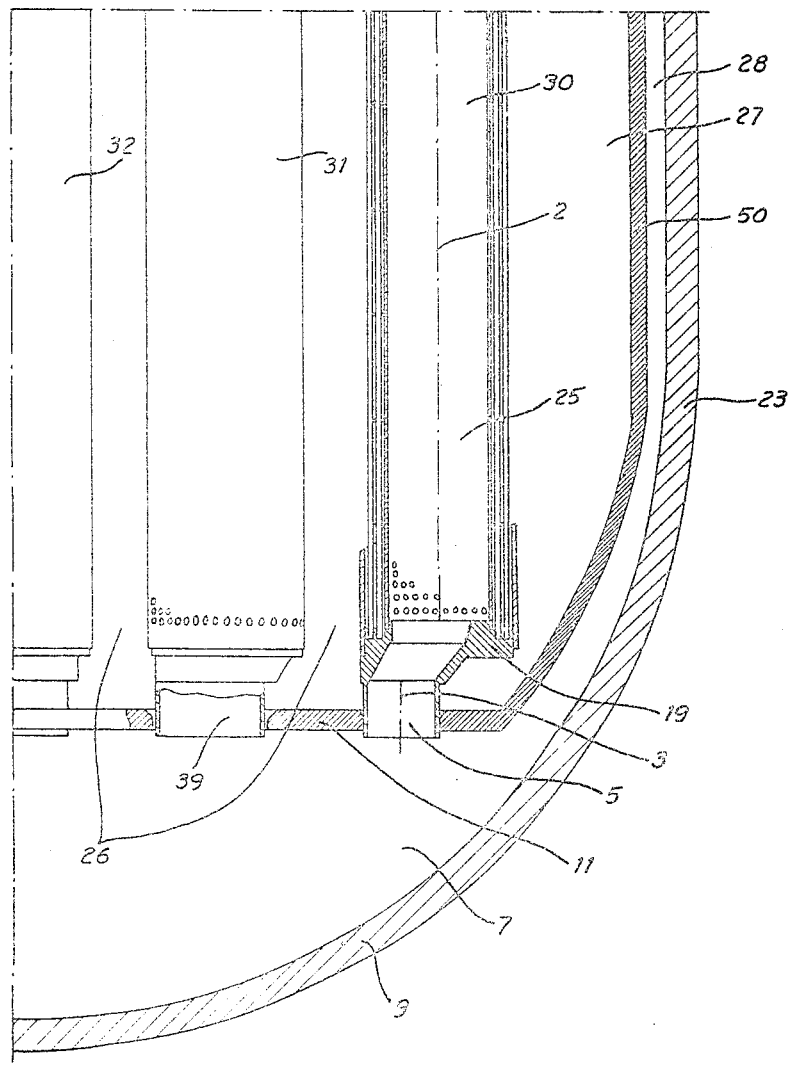
FIG. 1b is similar view of the lower right-hand part of the reactor.
Figure 1C:
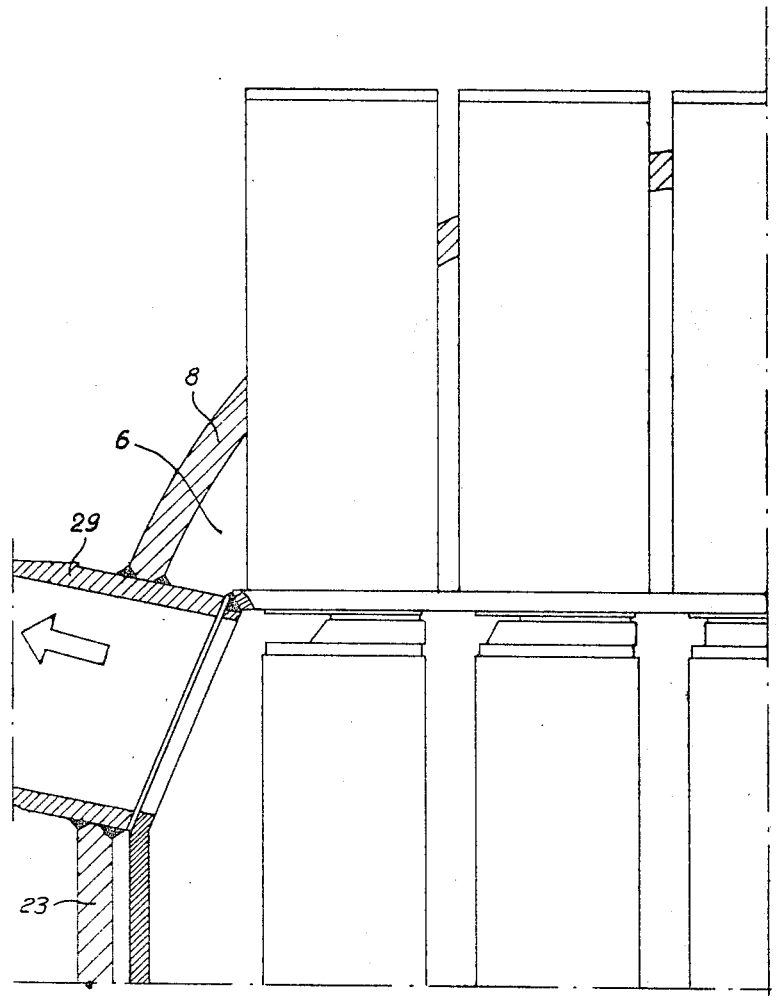
FIG. 1c is a vertical sectional view of the upper left-hand part of the reactor shown in FIGS. 1a and 1b.

The reactor as illustrated comprises a pressure tank 23 with spherical ends 8 and 9, intended for nineteen fuel elements, twelve of which (see FIG. 1b) are outer elements 30, six are interjacent elements 31 and one is the central element 32. FIGS. 1a, 1b and 1c show how a fuel element is made displaceable by means of a rotatable suspension of the same in the reactor tank, and by the fact that the longitudinal axis 2 of the fuel rod cluster 1 is eccentrically arranged in relation to the longitudinal axis 3 of the suspension device. The fuel rod cluster 1 is shown as an annular double-row fuel rod cluster which surrounds a part of the moderator in the central part 25 of the element, and is surrounded by the residual part 26 of the moderator outside the element (FIG. 1b). Other shapes of fuel rod clusters, as for instance a cluster without an interior moderator space, may be utilized as well.

Each fuel rod 1 is suspended in a top piece 18 and is guided at its lower end by a bottom piece 19. These rods are guided at several points by screen plates 20 which permit the cooling heavy water to flow perpendicularly in relation to the rods from the interior moderator space 25 to the outer moderator room 26. Each bottom piece 19 is attached to the corresponding top piece 18 by means of an inner perforated tube 21 and an outer perforated tube 22. Alternatively, the flow of the cooling medium may be directed along the length of the fuel rods 1. The water may then be led down inside the interior space 25 to the bottom piece 19 and from there flow upwards inside the fuel rod cluster 1 and be led out at the top piece 18 through openings in the outer tube 22. Tubes 21 and 22 are (in the case of the lengthwise flow) not perforated, if the perforation for leading to or from the cluster at the respective ends of the elements is not counted.

Fuel elements 30 of FIGS. 1a and 1b are each supplied with cooling water through the top as well as the bottom connections 4 and 5, from the top and the bottom distributors 6 and 7, respectively. The latter are formed by the top end 8 and the bottom end 9 of the reactor tank, and by corresponding parts of the means for shielding against radiation of the tank, namely, the top radiation shield 10 and the bottom radiation shield 11.

Elements 30, like the other elements 31 and 32, are lowered into the reactor through their fuel ports 12 formed by tubes 12a secured in the top end 8 of the reactor tank. When the elements are installed in the reactor, the fuel ports 12 are each filled by a solid port plug 13 which supports the corresponding element and is hermetically attached to the tube 12a by means such as bolts 14. The lower part of the port plug must not necessarily separate distributors 6 hermetically from the moderator room 26. On the other hand, openings 34 in the wall 12 of the fuel port, openings 35 in the port plug 13 and openings 36 in the top connection 4 of the element lead from the distributor 6 to the interior space 25 of the element.

The operating device 15 of the fuel element is rotatably arranged in the port plug 13 and supported by a supporting member 16 rotatably mounted on a bracket 33, the device 15 being sealed against the pressure of the reactor water by means of a seal 17. The longitudinal axes of the operating device 15 and of the connections 4 and 5 coincide.

By rotating the operating device 15 and its top part 37 outside the reactor tank, the center axis 2 of the fuel element can be displaced towards the center of the reactor without necessitating any reduction of the pressure in the reactor and shutting down the reactor power output.

The fuel element 30 is shown in FIGS. 1a and 1b in its extreme outer position. In this case, this is the position when the element may be pulled out. The central element 32 must not necessarily be moved and may have a non-rotatable suspension device. The intermediate elements 31 need only to have half of the movableness of the outer elements, and each of their operating devices therefore has (FIG. 1a) an eccentricity in relation to its port plug that is only one-half of that of the operating device of the outer elements. The cooling water connections 38 and 39 of the intermediate elements 31 may thus be made larger, which accords with the larger power output in the intermediate elements 31 as compared to that of the outer elements 30. However, all fuel elements may be provided with the same suspension arrangement as the outer elements.

Absorber rods for short term controlling and quick shutting down are not shown in FIG. 1a, 1b or 1c. Their function may be substituted by varied dissolution of absorber in the moderator water.

Controlling water is led to the reactor through one or more inlets 24 and distributed to the elements from the top through openings 34, 35, 36 and 4, and from the bottom after having passed the slot channel 28 and the bottom distributor 7 via connection 5. The water flows from the elements to the moderator room 26 and to the outer water of the reactor that is termed the reflector 27 and from there to the outlet 29 (FIG. 1c) to be cooled in heat consumers, A horizontal section through the reactor in FIGS. 1a and 1b is shown in FIG. 2, in which numeral 23 indicates the cylindrical parts of the pressure tank, numeral 50 indicates the radiation protection shield, and numeral 28 indicates the slot-shaped flow channel to the bottom distributor 7.

The outer contour of the fuel elements is represented by the circles 40 which also correspond to the fuel ports 12. The operating devices 15 in FIG. 1a are represented by circles 41 in FIG. 2.

Figure 2:
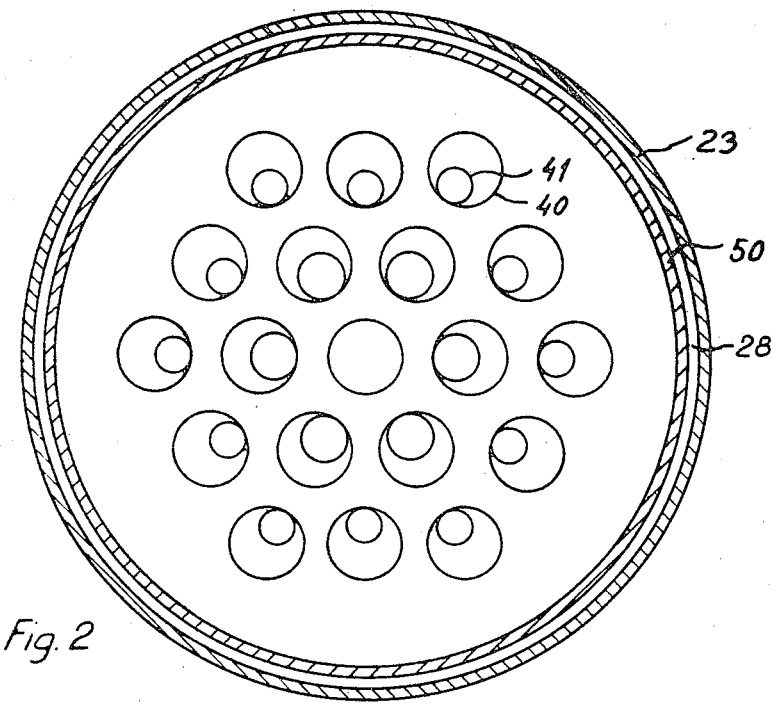
FIGS. 2 and 3 are horizontal sectional views, on a reduced scale, of the reactor shown in the preceding views, with the fuel elements in differently-turned positions.
Figure 3:
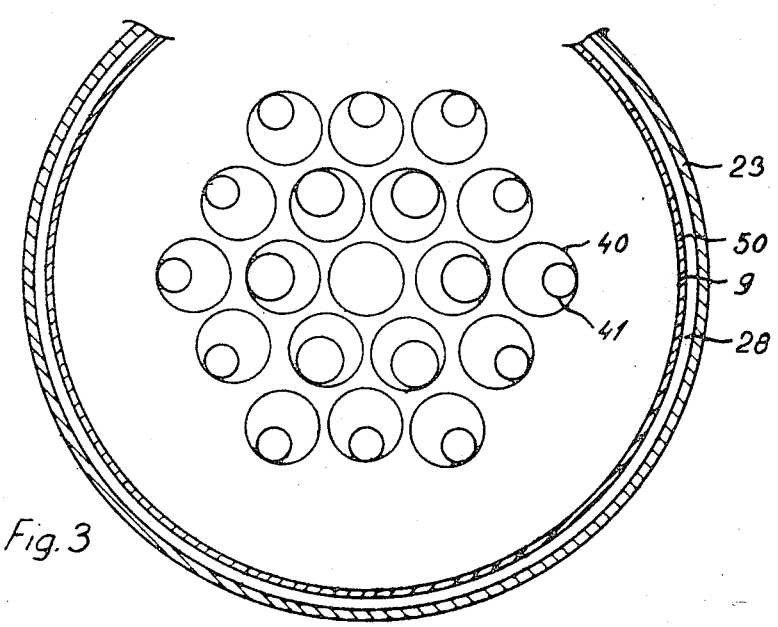

FIG. 3 shows the same section as FIG. 2 but with the fuel elements turned to positions that correspond to their positions when they are closest to the center of the reactor.

I claim:

1. In a heterogeneous nuclear power reactor, the combination of a core having a central axis, a plurality of fuel elements in the core extending generally parallel to said central axis and having respective longitudinal axes located at different radial distances from said central axis, means for feeding a moderator fluid into the core and between said fuel elements, and means mounting each of at least some of said fuel elements for rotation about only one axis which is offset from said core axis and which is eccentric to and parallels its said longitudinal axis, whereby the quantity of moderator fluid between the fuel elements is changeable.

2. The combination according to claim 1, comprising also top and bottom pieces in which the ends of each of said some fuel elements terminate, said mounting means including journals connected to said top and bottom pieces, respectively, said journals being coaxial with each other but eccentric to said longitudinal axis of the corresponding fuel element.

3. The combination according to claim 2, comprising also a radiation shield surrounding the fuel elements, the core having a fuel port for each of said some fuel elements, and a plug extending through each of said fuel ports, each said top piece being supported in one of said plugs, each said bottom piece being supported in said shield.

4. The combination according to claim 1, comprising also top and bottom pieces in which the ends of each of said some fuel elements terminate, said mounting means including journals connected to said top and bottom pieces, respectively, said journals being coaxial with each other but eccentric to said longitudinal axis of the corresponding fuel element, said top and bottom pieces being provided with cooling water channels leading to the respective fuel elements.

5. The combination according to claim 1, comprising also means exterior of the core for rotating said some fuel elements on said mounting means.

References Cited

UNITED STATES PATENTS

| 3,070,531 | 12/1962 | Huet | 176—28 |
| 3,079,320 | 2/1963 | Weill | 176—33 X |
| 3,201,318 | 8/1965 | Dickinson | 176—42 X |
| 3,220,573 | 11/1965 | Jouin | 176—29 X |
| 3,230,146 | 1/1966 | Astley et al. | 176—28 |
| 3,255,087 | 6/1966 | Maldague et al. | 176—42 |

REUBEN EPSTEIN, *Primary Examiner.*